June 14, 1932.  F. T. DAVIS  1,863,435
GRAVITY SYSTEM FOR MEASURING THE CONTENTS OF TANKS
Original Filed July 10, 1928   2 Sheets-Sheet 1

WITNESSES

INVENTOR
Frank T. Davis
BY
ATTORNEY

June 14, 1932. F. T. DAVIS 1,863,435
GRAVITY SYSTEM FOR MEASURING THE CONTENTS OF TANKS
Original Filed July 10, 1928   2 Sheets—Sheet 2

WITNESSES
Geo. N. Naylor
A. T. Sperry

INVENTOR
Frank T. Davis
BY Munn & Co.
ATTORNEYS

Patented June 14, 1932

1,863,435

UNITED STATES PATENT OFFICE

FRANK T. DAVIS, OF HABANA, CUBA

GRAVITY SYSTEM FOR MEASURING THE CONTENTS OF TANKS

Application filed July 10, 1928, Serial No. 291,561, and in Cuba May 13, 1928. Renewed April 26, 1932.

The invention relates to tank gauges. It is among the objects of the invention to provide an improved visual means for gauging the quantity of liquids within a tank, and to determine the rate of flow of liquids from or to the tank.

Another object of the invention is to provide visual gauging means which may be removably associated with a tank, thus preventing accidental injury to the gauge glass when not in use.

Another object of the invention is to provide visual gauging means without requiring the use of a gauge glass extending the full length of a tank.

A further object of the invention is to provide a novel and improved coupling for removably securing a gauge glass in liquid-tight relation with its receiving coupling.

Other objects of the invention include novel and improved gauge glass retaining members, and an improved means for securing a conduit in association with the tank.

These and other objects of the invention will be more apparent from reference to the accompanying drawings, in which—

Referring more particularly to the drawings, 10 represents a liquid tank. It is to be understood that the invention is not confined to the specific form of tank illustrated, the invention being applicable to many forms of liquid containers.

For roughly determining the approximate contents of the tank, there is provided a scale 11 over which a float controlled indicator 12 is adapted to move by connection with a flexible member 13, which may be actuated by a float member within the tank (not shown). It will be understood that in the use of the float controlled method of gauge, that inaccuracies take place, especially when viscous liquids are used which usually form a foam which raises the float, thus, moving the indicator 12 without accurately indicating the amount of liquid within the tank.

Figure 1:
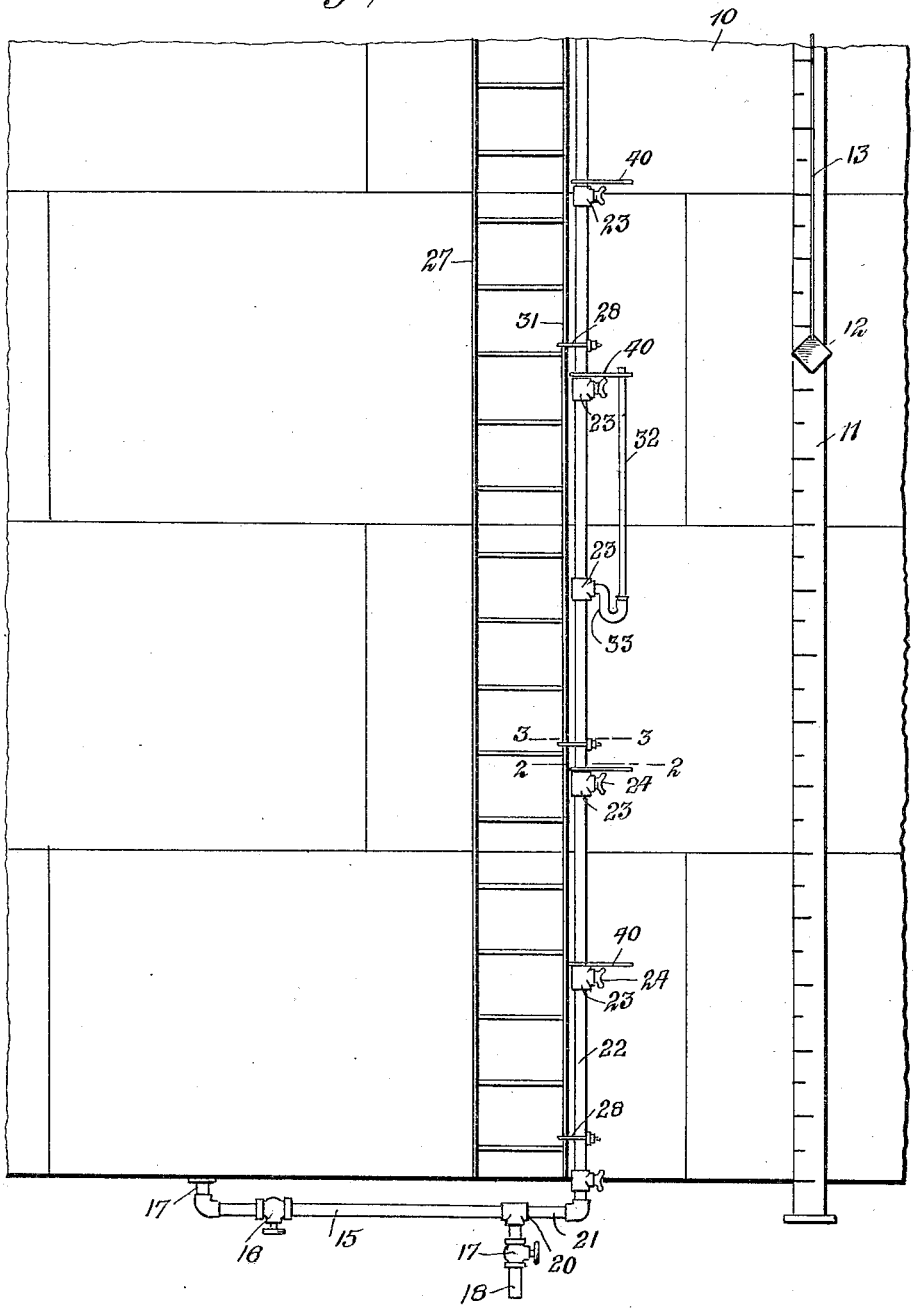
Fig. 1 is an elevation of my improved gauging assembly.
Figure 2:
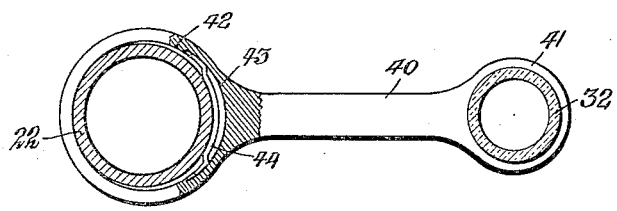
Fig. 2 is a sectional view taken on the line 2—2 of Fig. 1.
Figure 3:
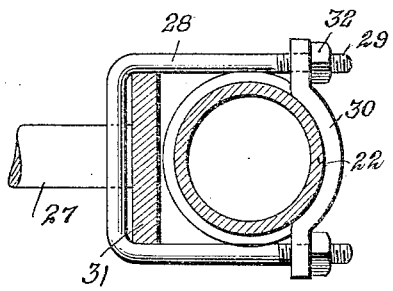
Fig. 3 is a sectional view taken on the lines 3—3 of Fig. 1.
Figure 4:
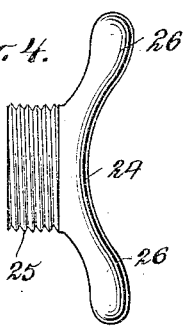
Fig. 4 is a detail view of an improved plug for use in the assembly.

It is an object of the present invention to overcome this inaccuracy. Associated with the tank any conventional form of supply or discharge system may be utilized. Such a system is disclosed in the present invention, including a supply or discharge pipe 15 controlled by valve 16 entering the tank as at 17. The liquid may enter or discharge through pipe 18 controlled by the valve 19; pipe 18 being associated with the pipe 15 through a T connection 20. To the opposite side of the T 20 my improved gauging means may be associated through suitable coupling 21. My gauging system includes a vertical stand pipe 22 provided at spaced intervals, determined by the length of the gauge glass to be used and the character of the tank, with T connections 23 which are normally provided with a wing plug 24 as illustrated in Fig. 4 of the drawings. The plug comprises an externally threaded body 25 which is preferably solid, and includes diverging wings 26 which may be readily utilized for attaching or detaching the plug to the T 23 by engagement of the threads 25 with the internal threads of the T. The stand pipe 22 is preferably secured to the tank ladder 27 by the use of my improved retaining means, as illustrated in Fig. 3, and which comprises a substantially U-shaped strap 28, the extremities of which are externally threaded as at 29 to accommodate pipe-embracing member 30. The U-shaped member is adapted to encircle the upright 31 of the ladder 27, to secure between the upright 31 and the pipe engaging member 30 the stand pipe 22 by the use of nuts 32 on the threaded extremities of the U 28, as clearly illustrated in Fig. 3.

When it is desired to accurately gauge quantities of liquid within the tank, the approximate height of the liquid may be readily observed from the pointer 12 in combination with the scale 11. Having thus determined the approximate height of the liquid, the actual height may be accurately determined by removal of the wing plug 24 from the T 23 after having closed the valve 16 to prevent the flow of liquid through the stand pipe 22. After removal of the plug 24, my improved gauge glass assembly as illustrated in Fig. 5 is applied to the T 23.

Figure 5:
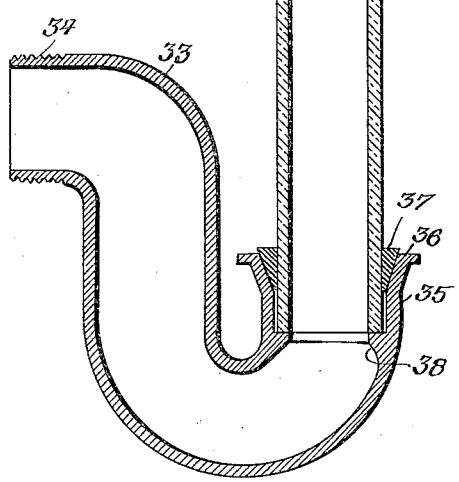
Fig. 5 is a detail sectional view of the gauge glass and my improved retaining means.

Referring more particularly to Fig. 5, my gauge glass assembly includes a tubular gauge glass 32 which is preferably scaled in a manner determined by the area of the tank and the length of stand pipe between the T's 23. The gauge glass 32 is receivable within a substantially curved gauge-receiving member 33 externally threaded as at 34 for engagement within the internal threads of the T 23. The opposite end of the member 33 is provided with a recess 35 slightly larger than the outside diameter of the gauge glass 32, the open end of which is flared as at 36 to receive a resilient packing ring 37 carried by the lower end of the gauge glass 32. Recess 35 forms in combination with the walls of the member 33 a shoulder 38 upon which the lower ends of the gauge glass 32 rests. The upper end of the gauge glass 32 is receivable within a retaining member 40 provided at one end with a circular aperture 41 through which the glass 32 is adapted to pass. The opposite end of the member 40 is provided with a larger circular aperture 42 which is adapted to encircle the stand pipe 32 and rest upon the T 23. A struck out portion 43 in the aperture 42 is provided, within which a spring element 44 may be inserted for retaining the member 40 in rigid engagement with stand pipe 22. After the gauge assembly has been properly connected with the desired T, the valve 16 is opened, liquid from the tank flowing therethrough and upwardly in stand pipe 22, and by gravity assuming a level in the stand pipe 22 equal to the level of liquid within the tank.

After the required determinations, the valve 16 may be closed, the gauge glass assembly removed, and the plug 24 returned to the T 23. Valve 16 may again be opened, and the usual ingress or egress of liquid may take place through the conduit 18. The gauge glass assembly may then be packed away securely without danger of damage until such time as it is desired to again make an accurate determination of the tank contents.

It may thus be seen that my invention provides for the accurate determination of height of the liquid without necessitating the use of an expensive gauge glass extending the entire length of the tank, the cost of which, in connection with large tanks would be prohibitive. The invention provides for the convenience and accuracy of visual observation of the tank contents by a cheap and simple apparatus.

Various changes and alterations might be made in the general form and arrangement of the parts described without departing from the invention. Hence I do not wish to limit myself to the details set forth, but shall consider myself at liberty to make such changes and alterations as fairly fall within the spirit and scope of the appended claims.

I claim:

1. A device of the character described comprising a stand pipe, a plurality of T's associated with said stand pipe, a plurality of plugs associated with said T's, and a gauge glass assembly adapted to be selectively associated with one of said T's upon removal of the plug from the T.

2. A device of the character described comprising, a stand pipe having means for attaching a gauge glass assembly at various points along the pipe, and a gauge glass assembly adapted to be removably and selectively associated at various points in such stand pipe, said assembly including means for attaching the gauge glass at the various points in the stand pipe.

FRANK T. DAVIS.